United States Patent
Yamada et al.

[11] Patent Number: 5,938,119
[45] Date of Patent: Aug. 17, 1999

[54] SUCK BACK VALVE

[75] Inventors: Hirosuke Yamada; Hitoshi Yamamoto, both of Ibaraki-ken; Kazuya Tamura, Soka, all of Japan

[73] Assignee: SMC Kabushiki Kaisha, Tokyo, Japan

[21] Appl. No.: 09/032,838

[22] Filed: Mar. 2, 1998

[30] Foreign Application Priority Data

Mar. 21, 1997 [JP] Japan ................................ 9-068758

[51] Int. Cl.⁶ ............................................ B05B 15/02
[52] U.S. Cl. .................... 239/119; 239/106; 222/571; 251/63.5; 251/331
[58] Field of Search .................. 239/104, 106, 239/119, 583, 586; 222/571; 251/63.5, 331, 129.15

[56] References Cited

U.S. PATENT DOCUMENTS

| | | | |
|---|---|---|---|
| 3,895,748 | 7/1975 | Klingenberg | 222/571 |
| 4,394,945 | 7/1983 | Taylor, Jr. | 222/571 |
| 4,597,719 | 7/1986 | Tano | 222/571 X |
| 5,134,962 | 8/1992 | Amada et al. | 222/571 X |
| 5,386,849 | 2/1995 | Gilchrist et al. | 251/331 X |
| 5,423,482 | 6/1995 | Mueller et al. | 239/119 X |

FOREIGN PATENT DOCUMENTS 8-10399 3/1996 Japan.

*Primary Examiner*—Andres Kashnikow
*Assistant Examiner*—Steven J. Ganey
*Attorney, Agent, or Firm*—Oblon, Spivak, McClelland, Maier & Neustadt, P.C.

[57] ABSTRACT

A suck back valve is proposed which prevents change in the amount of fluid which is sucked by the suck back valve, and which improves response accuracy of a diaphragm, together with accurately controlling a displacement amount and a displacement speed thereof. A diaphragm displaceably disposed confronting an interior of a flow passage is formed from a first membrane and a second membrane stacked on the first membrane, wherein the first membrane is sucked into contact with the second membrane through holes defined in the second membrane, by activation of a negative pressure generating source which is connected to a chamber through a passage, and wherein the form of the first membrane is maintained by the second membrane.

9 Claims, 5 Drawing Sheets

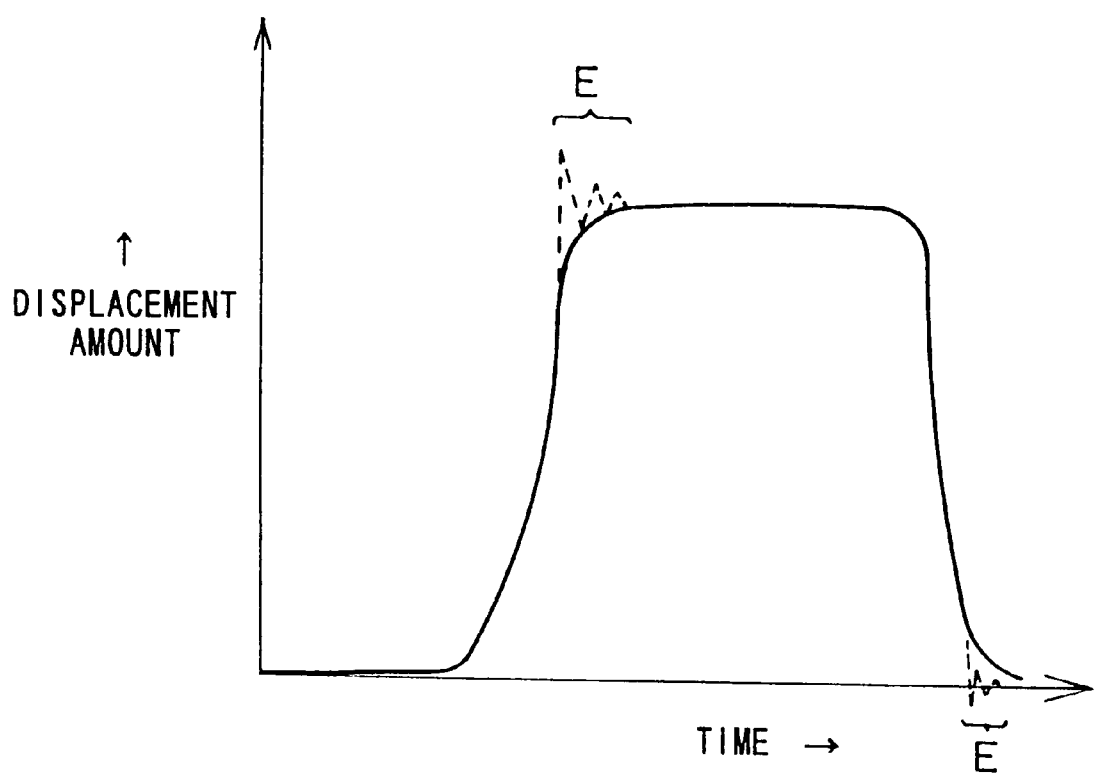

SUCK BACK VALVE

BACKGROUND OF THE INVENTION

1. Field of the Invention

The present invention relates to a suck back valve which, for example, prevents liquid drip from occurring in a fluid supply port, by sucking back a fluid which flows through a fluid passage in accordance with a displacement action of a diaphragm, yet which is capable of stabilizing the suck back amount of the fluid.

2. Description of the Related Art

The suck back valve has been hitherto used, for example, in a production process for forming semiconductor wafers. The suck back valve has a function to prevent so-called liquid drip, i.e. a phenomenon in which a minute amount of coating liquid drips toward the semiconductor wafer from a supply port when the supply of coating liquid to the semiconductor wafer is stopped.

A suck back valve according to a conventional technique is shown by FIG. 5, further details of which may be seen, for example, in Japanese Utility Model Publication No. 8-10399.

The suck back valve 10 includes a main valve body 18 formed with a fluid passage 16 for making communication between a fluid-introducing port 12 and a fluid-discharging port 14, and a bonnet 20 coupled to an upper portion of the main valve body 18. A diaphragm 26 formed from a fluorocarbon resin like material, for example, is displaceably disposed in the fluid chamber 16. A passage 19, which serves for supply and discharge of air inside of a chamber 17 which is covered by the diaphragm 26 when the diaphragm 26 is displaced, communicates with the chamber 17. A thick-walled portion 22 is formed in the center of the diaphragm 26, and a thin-walled portion 24 is formed in surrounding relation around the thick-walled portion 22.

A protrusion 27 is formed on an upper part of the thick-walled portion 22, the diaphragm 26 being connected to the piston 30 by fitting the protrusion 27 into a cavity 29 defined in a lower part of the piston 30. A v-packing 32, slidable along an inner wall surface of the valve body 18 and serving a sealing function, is installed on the piston 30. Further, a spring 34 which normally presses the piston 30 upwardly is disposed inside the valve body 18. A pressurized air supply port 28 is formed in the bonnet 20, wherein a pressurized air supply source (not shown) is connected to the pressurized air supply port 28 through an unillustrated flow amount control valve or the like. Further, reference numeral 36 indicates an adjustment screw abutting with the piston 30, for adjusting a flow amount of a coating liquid which is sucked by the diaphragm 26, by means of adjusting a displacement amount of the piston 30.

Operation of the suck back valve 10 shall now be explained in outline. In an ordinary state in which a coating liquid is supplied from the fluid-introducing port 12 to the fluid-discharging port 14, the flow amount control valve or the like is controlled, wherein pressurized air is supplied to the pressurized air supply port 28 from the pressurized air supply source. As a result, the piston 30 is displaced downwardly in accordance with the pressure of the pressurized air, and the diaphragm 26 which is coupled to the piston 30 protrudes into the fluid passage 16, as shown in FIG. 5 by the two-dot chain line.

When flow of coating liquid through the fluid passage 16 is halted, the piston 30 and diaphragm 26 are raised in unison under an action of the elastic force exerted by the spring 34, by controlling the flow amount control valve, or the like, and stopping the supply of pressurized air supplied to the pressurized air supply port 28 from the pressurized air supply source. Along with controlling such displacement by abutment of an end of an adjustment screw 36, a predetermined amount of coating liquid remaining in the fluid passage 16 is sucked under action of a negative pressure produced by the diaphragm 26. Thus, dripping of coating liquid, which would otherwise be caused at a fluid supply port connected to the fluid-discharging port 14 is prevented.

Notwithstanding, in the suck back valve 10 of the above-noted conventional technique, when the diaphragm 26 is used for an extended period, the diaphragm 26 deforms due to repeated sucking of coating liquid inside the flow passage 16, and there is the problem that the initial condition of the diaphragm cannot be maintained, whereby the amount of coating liquid sucked by the suck back valve 10 changes, along with shortening the useful life of the diaphragm 26. Further, when as described above, the initial condition of the diaphragm 26 cannot be maintained, it becomes easy for regions to be generated in the diaphragm 26 in which liquid collects, wherein coating liquid which contacts regions in which such liquid is collected becomes deteriorated, and there is the drawback that coating liquid which flows through the fluid passage mixes with such deteriorated coating liquid, polluting the coating liquid.

Furthermore, the piston 30 and the thick-walled portion 22 of the diaphragm 26 are screwed together, wherein a clearance, caused by loosening of the screw, at a connecting region between the piston 30 and the diaphragm 26 can be generated. As a result of such a clearance, an error in the displacement amount of the diaphragm 26 results, indicating a problem that errors are generated in the amount of fluid sucked by the suck back valve.

SUMMARY OF THE INVENTION

A general object of the present invention is to provide a suck back valve capable of preventing changes in an amount of sucked fluid when a fluid flowing through a fluid passage is sucked by a diaphragm, in accordance with introducing a negative pressure to a chamber in which the diaphragm is arranged, and sucking the fluid in a same direction as the displacement direction of the diaphragm.

A main object of the present invention is to provide a suck back valve wherein, even in the case of repeated sucking of a coating liquid, a first membrane making up a diaphragm does not become deformed, enabling stabilization in the amount of sucked coating liquid and prolonging the useful life of the diaphragm, by sucking the first membrane making up the diaphragm through holes defined in a second membrane of the diaphragm, when a negative pressure is introduced to the chamber.

Another object of the present invention is to provide a suck back valve capable of minimizing errors in the sucked fluid, by surrounding a thick-walled portion of the diaphragm by a cylindrical member, threadedly inserting a screw having a conical part thereon in a space of the cylindrical member, inserting the conical part in a cross-sectionally V-shaped recess formed in the thick-walled portion, and supporting the thick-walled portion in the cylindrical member, thereby preventing generation of a clearance between the diaphragm and the conical part.

Another object of the present invention is to provide a suck back valve capable of reliably controlling a displacement amount and a displacement speed of the diaphragm, in accordance with displacement of the diaphragm by an electric actuator.

A still further object of the present invention is to provide a suck back valve enabling a system to be made small in scale, and enabling ease of installation, by integrally constructing the suck back valve with an ON/OFF valve.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a graph illustrating a displacement amount of the diaphragm with respect to time, of the suck back valve according to an embodiment of the present invention.

DESCRIPTION OF THE PREFERRED EMBODIMENTS

Figure 1:
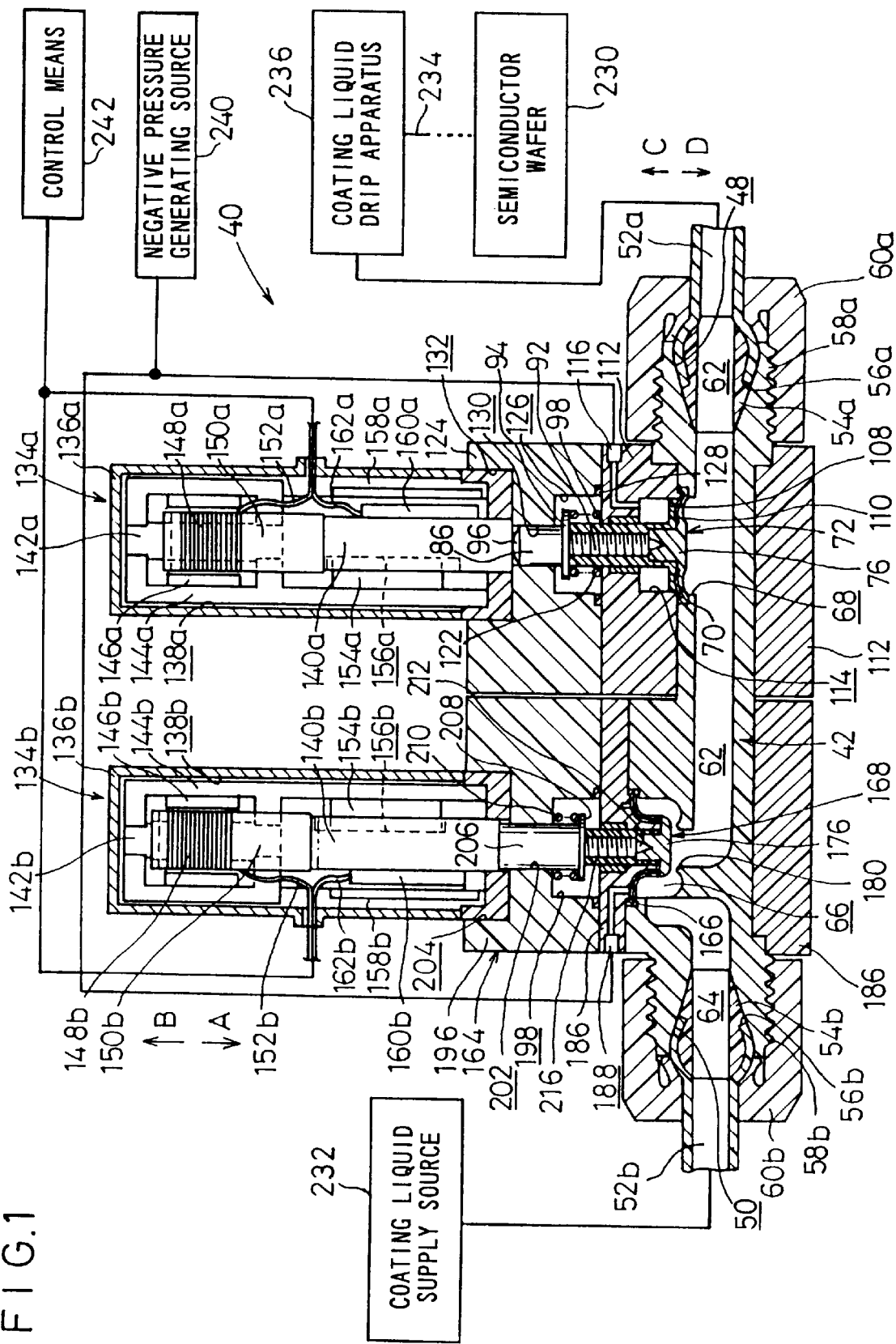
FIG. 1 is a partial vertical cross-sectional view illustrating in outline a suck back valve according to an embodiment of the present invention.

In FIG. 1, reference numeral 40 shows the suck back valve according to an embodiment of the present invention. The suck back valve 40 comprises a longitudinally dimensioned valve body 42, having a first port 48 formed on one end side of the valve body 42, and a second port 50 formed on the other end side. Connecting elements 54a, 54b, coupled to ends of tubes 52a, 52b, are disposed in the respective ports 48, 50, wherein the ends of tubes 52a, 52b are coupled to steps 56a, 56b formed on the outer circumference of the connecting elements 54a, 54b, thereby determining the position of the tubes 52a, 52b. Respective male threads 58a, 58b are engraved on ends of the valve body 42, wherein the tubes 52a, 52b are press-supported onto the first and second ports 48, 50 of the valve body through the connecting elements 54a, 54b, by threadedly fitting lock nuts 60a, 60b over the male threads 58a, 58b.

Figure 2A:
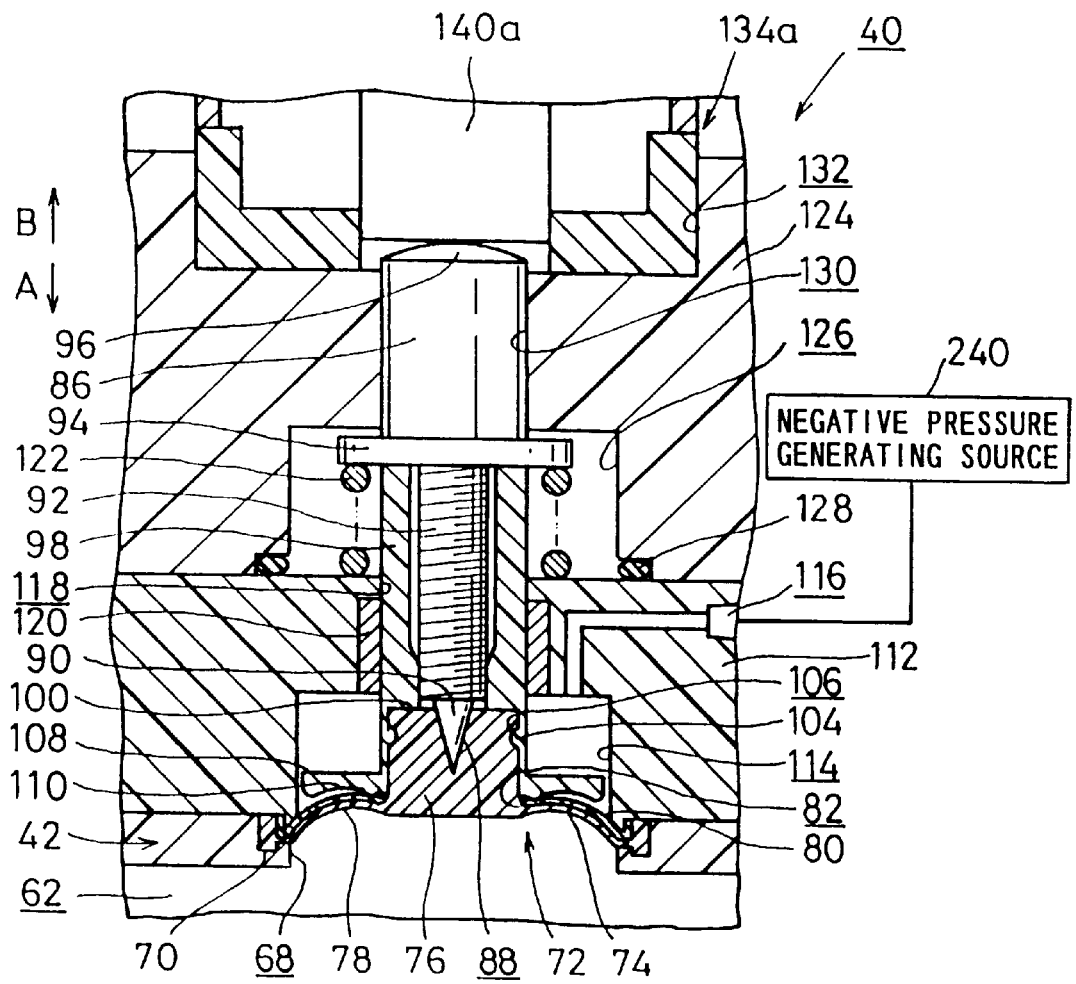
FIG. 2A is a partial enlarged vertical cross-sectional view showing a displaced condition of the diaphragm.
Figure 2B:
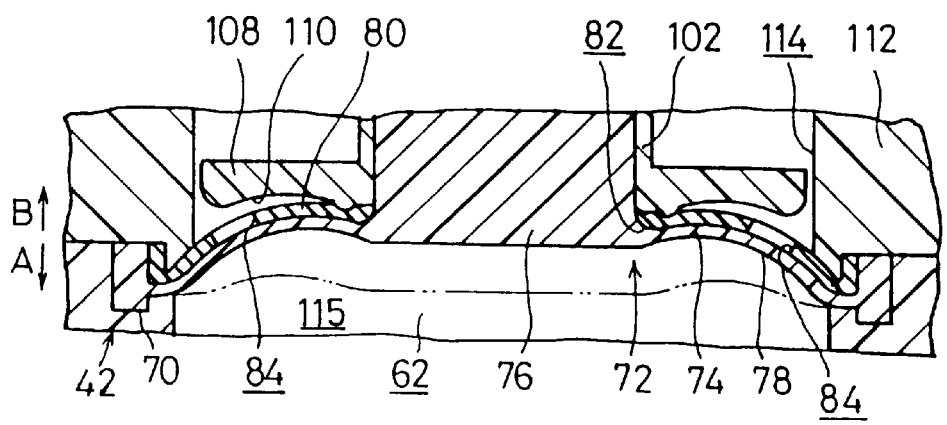
FIG. 2B is a partial enlarged vertical cross-sectional view showing a structure of the diaphragm.

A fluid passage 64 is defined inside the valve body 42, having a fluid passage 62 communicating with one tube 52a, and a fluid passage 64 communicating with the other tube 52b. The respective fluid passage 62, 64, bend upwardly inside the valve body 42, as shown in FIG. 1, communicating with a cavity 66 defined in the valve body 42. A hole 68 is formed substantially in the center of one fluid passage 62, and as shown in FIGS. 2A and 2B, a step 70 is formed on a wall formed by the hole 68. An edge of a first membrane 74 making up a diaphragm 72 is attached to the step 70, and a thick-walled portion 76 is formed in the center of the first membrane 74. The first membrane 74 is formed, for example, from a fluorocarbon resin like resinous material. A second membrane 80 making up the diaphragm 72 is disposed on an upper surface of the first membrane 74, the second membrane 80 being formed, for example, from a base fabric inserted rubber material. The first membrane 74 and the second membrane 80 are formed as separate bodies, which are integrally constructed by stacking one atop the other. Along with a hole 82 defined in the center of the second membrane 80 through which the thick-walled portion 76 penetrates, a plurality of small holes 84, arranged ring-like around the periphery thereof, are also defined in the second membrane 80.

A flange 108 of a cylindrical member 98 which is connected to the thick-walled portion is disposed on an upper part of the diaphragm 72, and a bent surface 110 is formed on a lower surface of the flange 108. As a result, when the second membrane 80 comes into contact with the flange 108, the form of the second membrane 80 is maintained along the curved surface 110. A protrusion 104 is formed around an inner circumference of the cylindrical member 98, whereby a groove 106 defined circumferentially around an outer periphery of the thick-walled portion 76 fits onto the protrusion 104. Female threads (not shown) are engraved into the inner periphery of the cylindrical member 98 through the step 100, wherein male threads 92 formed on a lower part of a rod-like displacement member 86 are screwed into the female threads. A conical part 90 is formed on a lower end of the displacement member 86 which fits into a cross-sectionally v-shaped cavity 88 defined on an upper part of the thick-walled portion 76. The vertical cross-sectional configuration of the conical part 90 corresponds to the vertical cross-section of the cavity 88, however, the conical part 90 is formed slightly larger than the vertical cross-sectional configuration of the cavity 88 itself. As a result, when the male screw 92 is threaded into the cylindrical member 98 and the conical part 90 is displaced relatively with respect to the cylindrical member 98 in the direction or arrow A, the conical part progressively enters into the cavity 88, causing the wall formed by the cavity 88 to expand in a radial outward direction. However, because the outer circumference of the thick-walled portion 76 is joined to the inside wall of the cylindrical member 98, the thick-walled portion 76 is forcibly squeezed and supported by the conical part 90 and the cylindrical member 98. Accordingly, differing from use of the screw attachment method of the conventional technique, there is no generation of a clearance at the connecting region of the diaphragm 72.

A flange 94 is formed on an upper part of the male screw 92 in the displacement member 86, and in addition, a rounded surface part 96 is formed on an upper end of the displacement member 86.

A support member 112 is disposed surrounding an outer circumferential surface part of the valve body 42, wherein an edge of the diaphragm 72 is sandwiched between the support member 112 and a step 70 of the valve body 42. An enclosed chamber 114 is formed by means of the diaphragm 72 in the support member 112, with a passage 116 defined therein in mutual communication with the chamber 114. A hole 118 is defined on an upper surface part of the chamber 114 through which the cylindrical member 98 penetrates, wherein a flange 120 is disposed on a wall formed along the hole 118. One end of a coil spring 122 which surrounds the cylindrical member 98 is seated on an upper surface of the support member 112, and the other end of the coil spring 122 is seated on the flange 94 of the displacement member 86. As a result, the displacement member 86 is in a state in which it is biased in the direction of arrow B by the coil spring 122.

A body 124 is affixed to an upper part of the support member 112, the body 124 having a cavity 126 defined in a lower portion thereof which communicates with the hole 118, and an O-ring 128 is disposed along an opening of the cavity 126 for preventing leakage of pressurized air and the like. A hole 130 is defined in the body 124 communicating with the cavity 126, wherein the displacement member is slidably inserted in the hole 130. A cavity 132 is defined on an upper part of the body 124, the cavity 132 communicating with the hole 130. As shown in FIG. 1, a first linear voice coil type luffing device 134a, which makes up an electric actuator, is disposed in the cavity 132. The linear voice coil type displacement device 134a includes a housing 136a with a longitudinal stem 140a which is displaceable in the directions of arrows A and B disposed inside a chamber 138a of the housing 136a. A lower end of the stem 140a abuts against the rounded surface part 96 of the displacement member 86. A fixed iron core 142a is disposed in an upper central region inside the chamber 138a, wherein the fixed iron core 142a is formed to extend for a predetermined length only along a lengthwise direction of the housing 136a.

Further, a permanent magnet 146a is disposed inside the chamber 138a at a fixed interval separation from the iron core 142a, and affixed to an inner wall of the housing 136a through a support member 144a. In this case, a substantially horizontally directed magnetic field is formed in a space between the permanent magnet 146a and the fixed iron core 142a. Further, a displacement element (bobbin) 150a having an electromagnetic coil wound thereon is arranged intervenM ingly between the fixed iron core 142a and the permanent magnet 146a, the displacement element 150a being integrally displaceable with the stem 140a. Furthermore, a predetermined clearance is formed between the fixed iron core 142a and the displacement element 150a. Reference numeral 152a indicates lead lines through which a current flows to the electromagnetic coil 148a.

A guide member 154a is disposed on an inner wall of the housing 136a, the guide member 154a guiding the stem 140a along a straight line by connection with a guide groove 156a defined in the stem 140a.

An encoder 160a is fixed to an opposite side from the guide member 154a on the inner wall of the housing 136a through a support member 158a. The encoder 160a comprises an unillustrated photosensor fixed to a side of the housing 136a, and a glass scale (not shown) affixed to a side of the stem 140a and formed by a glass substrate having scale values formed thereon at fixed separations. In this case, a displacement amount of the stem 140a is detected by the unillustrated photosensor via the glass scale, wherein a detection signal output from the photosensor is fed back to an unillustrated control means via lead lines 162a. Accordingly, a displacement amount of the stem 140a can be controlled highly accurately by the control means based on the photosensor detection signal.

Figure 3A:
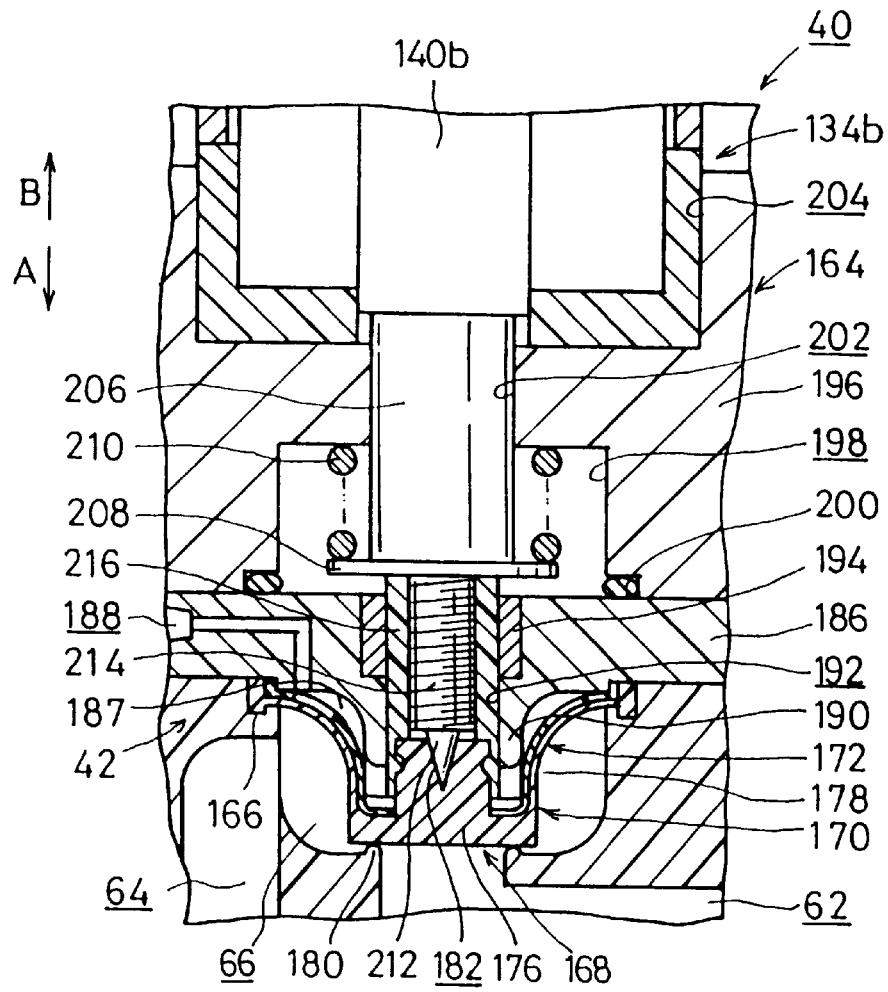
FIG. 3A is a partial enlarged vertical cross-sectional view showing a displaced condition of an ON/OFF valve diaphragm.
Figure 3B:
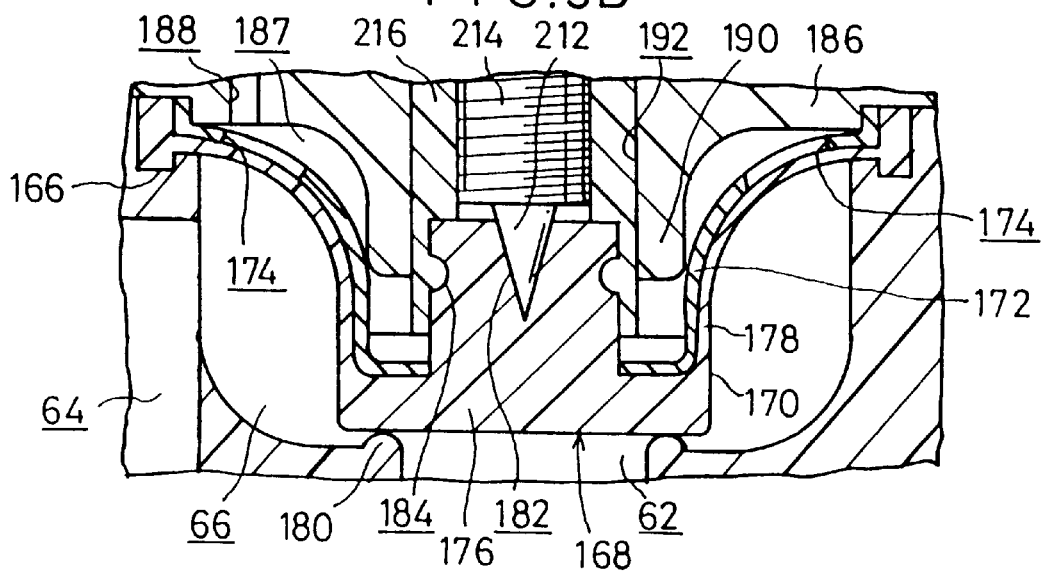
FIG. 3B is a partial enlarged vertical cross-sectional view showing a structure of the ON/OFF valve diaphragm.
Figure 5:
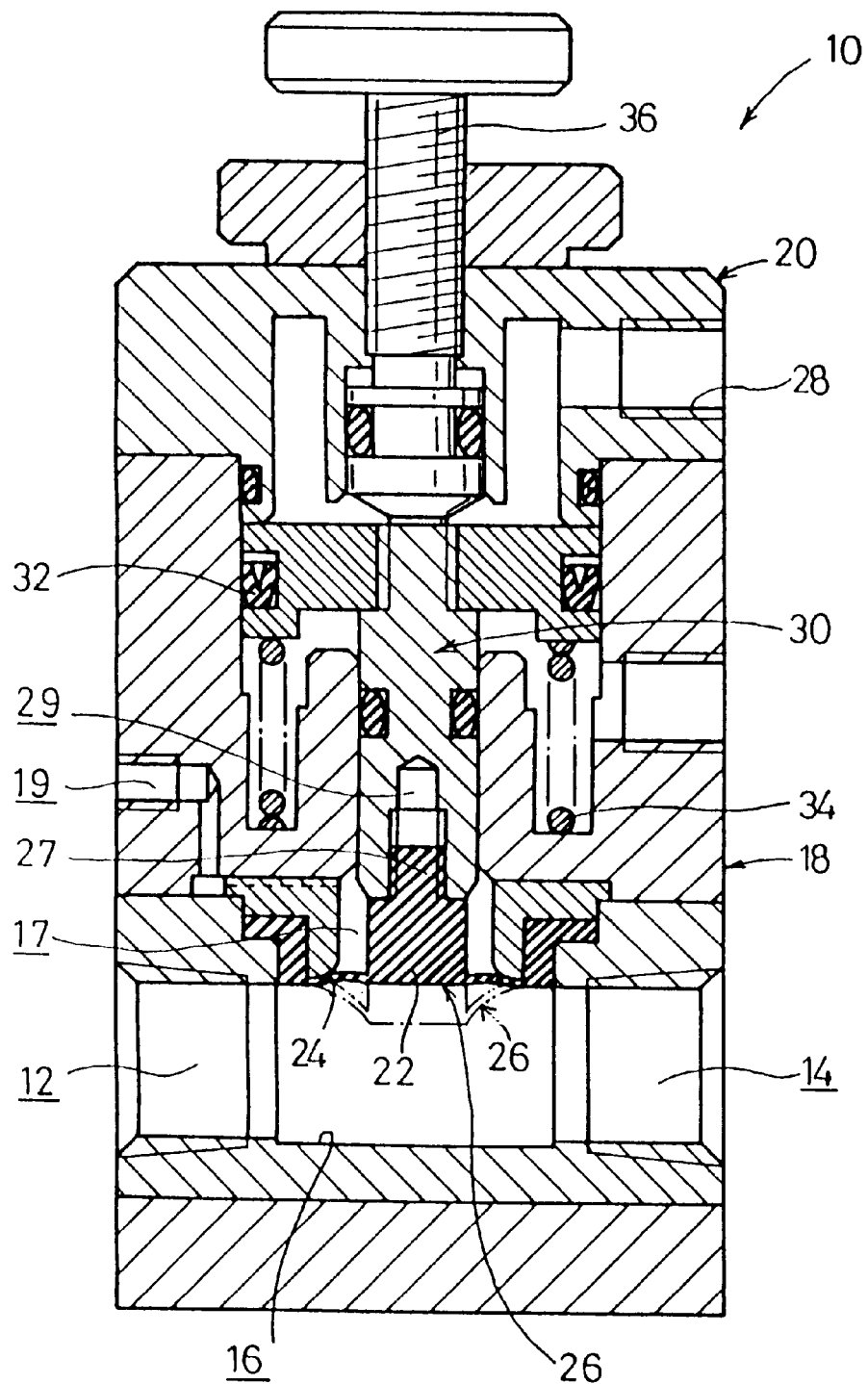
FIG. 5 is an outline vertical cross-sectional view of a suck back valve according to a conventional technique.

An ON/OFF valve 164 faces an opening of the fluid passages 62, 64 of the valve body 42. The ON/OFF valve 164, as shown in FIGS. 3A and 3B, is equipped with an ON/OFF valve diaphragm 168 which contacts a step 166 formed on a wall of the cavity 66. The ON/OFF valve diaphragm 168, similar to the diaphragm 72, is constructed by a first membrane 170 and a second membrane 172, the second membrane 172 having a plurality of small holes 174 defined therein and arranged in a ring. A thick-walled portion 176 is formed in a center of the first membrane 170. As a result, when the thick-walled portion 176 is displaced in the direction of arrow A, by flexure of the first membrane 170, the thick-walled portion 176 becomes seated on a seat 180 formed on an opening of the fluid passage 62, thereby shutting off access to the fluid passage 62. On the other hand, when the thick-walled portion is displaced in the direction of arrow B, communication is established between the fluid passage 62 and the fluid passage 64. A cross-sectionally v-shaped recess 182 is defined on an upper part of the thick-walled portion 176, and further, a circumferential groove 184 is defined on an outer wall of the thick-walled portion 176.

A support member 186 is disposed surrounding the valve body 42, wherein edges of the first membrane 170 and the second membrane 172 are sandwiched between the support member 186 and a step 166 of the valve body 42. A chamber 187 which is blocked by the ON/OFF valve diaphragm 168 is formed in the support member 186. A passage 188 communicating with the chamber 187 is defined in the support member 186, the passage 188 communicating to an outside part of the support member 186. A protrusion 190 which projects into the cavity 66 is formed in the support member 186, with a hole 192 defined in a center of the protrusion 190. A thick-walled portion 176 of the ON/OFF valve diaphragm 168 is fitted into the hole 192, and a flange 194 is disposed on a wall formed along the hole 192.

A body 196 is affixed to an upper part of the support member 186. A cavity 198 which communicates with the hole 192 is defined in the body 196, with an O-ring 200 being disposed along an opening of the cavity 198. Another cavity 204 which communicates through a hole 202 with the cavity 198 is defined on an upper part of the body 196. As shown in FIG. 1, a second linear voice coil type luffing apparatus 134b, which makes up an ON/OFF valve electric actuator, is disposed in the cavity 204. The second linear voice coil type displacement device 134b is constructed similarly to the first linear voice coil type displacement device 134a, and thus, like elements thereof have been designated using the same reference numerals with the reference letter b added thereto, and detailed explanation of such elements shall be omitted.

A rod shaped displacement element 206 is affixed to a lower part of the stem 140b of the second linear voice coil type displacement device 134b, the displacement member 206 being inserted into the hole 202 and the cavity 198. On an outer circumference of the displacement element 206, as shown in FIG. 3A, a flange 208 is formed, wherein one end of a coil spring 210 is seated on an upper surface of the flange 208, and the other end of the coil spring 210 is seated on an upper surface part formed by the cavity 198. Accordingly, the displacement element 206 is normally biased in the direction of arrow A by the coil spring 210. A displacement element 206 is connected to the thick-walled portion 176 of the diaphragm, and similarly, a conical part 212 is formed on an end of the displacement element 206, the conical part 212 being progressively inserted into a cavity 182 of the thick-walled portion 176, thereby gripping the thick-walled portion 176 by a cylindrical member 216 which is threadedly inserted into male threads 214 formed on the conical part 212 and the displacement member 206.

The suck back valve 40 according to the embodiment of the invention is basically constructed as described above. Next, an explanation shall be given of the operation thereof.

First, as shown in FIG. 1, a coating liquid drip apparatus 236 having a nozzle 234 facing a semiconductor wafer 230 for dripping a coating liquid thereon, is connected to a tube 52a communicating with a first port 48 of the suck back valve 40. On the other hand, a coating liquid supply source 232 storing therein a coating liquid which is dripped onto the semiconductor wafer 230 is connected to a tube 52b communicating with the second port 50. Further, a negative pressure generating source 240 is connected respectively to passages 116 and 188, the negative pressure generating source 240 normally being in an activated state. In addition, the first linear voice coil type displacement device 134a and the second linear voice coil type displacement device 134b are connected to a controller 242.

At this point, when the first linear voice coil type displacement device 134a is energized to the controller 242 and a current flows to the electromagnetic coil 148a, an electromagnetic force is generated in the electromagnetic coil 148a. As a result of mutual actions between the magnetic field formed by the permanent magnet 146a and the fixed iron core 142a, and the aforementioned electromagnetic force, according to Flemming's left-hand rule, the displacement member 150a which is wound by the electromagnetic coil 148a is displaced integrally together with the stem 140a. The electromagnetic force can be adjusted to attain a desired size and continuity time, by appropriate adjustment of the size of the current flowing through the electromagnetic coil 148a. Further, by reversing the polarity of the current flowing through the electromagnetic coil 148a, the direction of the force can be switched from the direction of arrow A to that of arrow B, and vice versa.

When the stem 140a is displaced in the direction of arrow A as described above, the displacement member 86 is displaced in opposition to the elasticity of the coil spring 122, and the thick-walled portion 76 of the diaphragm 72 is displaced to confront the flow passage 62. Further, the second linear voice coil type displacement device 134b is energized by the controller 242, whereby the thick-walled portion 176 of the ON/OFF valve diaphragm 168 separates from the seat 180, and the flow passages 62 and 64 are put into communication with each other.

Furthermore, the negative pressure generating source 240 is normally activated, and therefore, the generated negative pressure acts on the first membrane 74 through the small holes 84 in the second membrane 80. As a result, the first membrane 74 is sucked into contact with the second membrane 80 and is supported by the second membrane 80, and the first membrane 74 is kept in a state in which it is bent oppositely to (i.e. away from) the flow passage 62 (see FIG. 2B).

After the above preparatory steps are completed, the coating liquid supply source 232 is activated so that coating liquid flows from one tube 52b through passages 62, 64 and is supplied to the coating liquid drip apparatus 236, through which coating liquid is dripped onto the semiconductor wafer 230 from the nozzle 234. As a result, a coating layer (not shown) having a desired thickness is formed on the semiconductor wafer 230. At this time, although the coating liquid inside the fluid passage 62 pushes against the diaphragm 72 in the direction of arrow B, because the diaphragm 72 is supported by the second membrane 80, there is no concern that the thick-walled portion 76 of the diaphragm 72 will be displaced in the direction of arrow B.

Following application of a desired amount of coating liquid to the semiconductor wafer 230, the second linear voice coil type displacement device 134b associated with the ON/OFF valve 164 is energized by the controller 242, whereby the stem 140b is displaced in the direction of arrow A. As shown in FIG. 3A, the thick-walled portion 176 of the ON/OFF valve diaphragm 168 comes into contact with the seat 180, thereby interrupting communication between the fluid passages 62 and 64. Accordingly, dripping of coating liquid from the nozzle 234 of the coating liquid drip apparatus 236 onto the semiconductor wafer 230 is halted.

In this case, coating liquid immediately preceding that which has been dripped onto the semiconductor wafer 230 remains inside the nozzle 234, and thus there is a fear that liquid dripping may occur. To respond to this concern, the first linear voice coil type displacement device 134a is energized by the controller 242, and when the stem 140a is displaced in the direction of arrow B, the displacement member 86 likes displaces in the direction of arrow B by the elastic force of the coil spring 122. Because of this, as shown by the actual lines in FIG. 2B, the thick-walled portion 76 of the diaphragm 72 is displaced in the direction of arrow B, whereby a predetermined amount of coating liquid inside the fluid passage 62 is sucked by a negative pressure action generated in the fluid passage 62. As a result, any coating liquid inside the nozzle 234 of the coating liquid drip apparatus 236 is returned in the direction of arrow D, whereby unwanted liquid dripping with respect to the semiconductor wafer 230 can be prevented (see FIG. 1).

At this time, because the linear voice coil type displacement devices 134a, 134b are controlled electrically, displacement of the stems 140a, 140b can be easily and accurately controlled. As a result, as shown by the actual lines in FIG. 4, the diaphragms 72, 168 can be smoothly displaced, and when the diaphragms are displaced, no overshooting E of the diaphragms is generated, as shown by the broken lines in FIG. 4, as occurs with the convention technique in which displacement speed of the diaphragm is controlled by a pressure of pressurized air. Accordingly, for example, when employing the ON/OFF valve 164, generation of air bubbles due to occurrence of such overshooting is suppressed, and deterioration in quality of the coating liquid supplied to the semiconductor wafer 230 is prevented.

Further, because the controller 242 controls displacement of the stem 140a based on a displacement amount signal of the stem 140a input from the encoder 160a of the first linear voice coil type displacement device 134a, displacement of the diaphragm 72 can be highly accurately controlled. Accordingly, the amount of coating liquid sucked by the suck back valve 40 can be controlled with high precision.

Furthermore, when the diaphragm 72 is displaced in the direction of arrow B, as a result of the negative pressure generated thereby in the fluid passage 62, there is a concern that the first membrane 74 may become deformed in a downwardly bent state. However, in the present embodiment, an equal sucking force is applied to the first membrane 74 under action of the negative pressure supply source 240, and because it is intimately supported in contact with the second membrane 80, the first membrane 74 is kept in its proper upwardly bent state (see FIG. 2B).

When coating liquid is again supplied to the semiconductor wafer 230, the controller 242 is reactivated, whereby the stem 140 of the second linear voice coil type displacement device 134b is displaced integrally with the thick-walled portion 176 of the diaphragm 168, establishing communication between passages 62 and 64. As a result, the coating liquid, as described previously, is supplied to the coating liquid drip apparatus 236, and drips from the nozzle 234 onto the semiconductor wafer 230. At this time, the first linear voice coil type displacement device 134a is energized by the controller 242, and when the stem 140a is displaced in the direction of arrow A, the thick-walled portion 76 of the diaphragm 72 is displaced integrally with the displacement member 86 in the direction of arrow A, so that coating liquid is pushed out through the passage 62. As a result, coating liquid which had been returned from the nozzle 234 in the direction of arrow D during prevention of liquid dripping is now supplied in the direction of arrow C, wherein the coating liquid swiftly drips again onto the semiconductor wafer 230. At this time, the second membrane 80 abuts with the curve surface 110 formed on the lower surface of the flange 108, so that the shape of the second membrane 80 is maintained along the curved surface 110. Accordingly, variation in the amount of coating liquid which is pushed out from the fluid passage 62 is prevented, and at the start of supply of coating liquid, there is no concern of changes in the coating liquid amount which is dripped onto the semiconductor wafer 230.

In the present embodiment, the diaphragm 72 is sucked in accordance with a negative pressure introduced to the chamber 114, and is maintained in a curved state in a same direction as that of the displacement of the diaphragm 72, or more specifically, in a direction away from the fluid passage 62. As a result, when the diaphragm 72 is displaced by activation of the first linear voice coil type displacement device 134a, and a negative pressure is generated in the fluid passage 62, the diaphragm 72 does not bend toward the fluid passage 62, and therefore any concerns of change occurring in the amount of coating liquid sucked by the suck back valve 40 can be dispensed with.

Further, in the present embodiment, compared to a single layer structure diaphragm as used in the conventional technique, a double-layered structure made up of stacked first and second membranes 74, 80 is employed. Because the first membrane 74 is sucked into contact with the second membrane 80 by activation of the negative pressure generating source 240, and the form of the first membrane 74 is kept in an upwardly curved state, the first membrane 74 is not deformed by pressure imposed by the coating liquid flowing through the fluid passage 62, and by stacking of the second membrane 80 which is highly resistant to pressure on the first membrane 74, high resistance to pressure can be attained. Further, there is no concern that collection of liquid within the diaphragm itself will occur, and thus there is no deterioration or polluting of the fluid which flows through the fluid passage 62.

In this case, if the diaphragm were formed by integrally gluing together a resin-formed membrane body and a rubber membrane body using an adhesive or the like, relative displacement between the resin-formed membrane body and the rubber membrane body is regulated by the adhesive surface formed between the resin-formed membrane body and the rubber membrane body, so there is a problem of hindering smooth flexibility of the pressure receiving surface.

With respect to this problem, in the present embodiment, a resin-produced first membrane 74 and a rubber-produced second membrane 80, which are constructed in a stacked manner, are employed. Therefore, the first and second membranes 74 and 80 are separately and independently displaceable, and since the diaphragm remains smoothly flexible, an improvement in response accuracy thereof becomes possible.

Further, the thick-walled portion 76 of the first membrane 74 is gripped between a conical part 90 and an inner wall of a cylindrical member 98, which are constructed so as to be displaceable by the first linear voice coil displacement device 134a. Thus, no clearance is generated between the diaphragm 72 and the conical part 90, and stability in the fluid amount sucked by the diaphragm 72 can be maintained.

Furthermore, because an electric actuator is used for displacing the diaphragm 72, and the diaphragm 72 used for sucking fluid is driven via electric controls, as compared to the prior technique using pressurized air or the like, the response time of the diaphragm is shortened, and operation from halting supply of fluid until the fluid is sucked back can be swiftly performed.

In the above-described embodiment, the electric actuators comprise a linear voice type displacement devices, however, the invention is not limited to such. For example, a linear actuator comprising a ball screw disposed on the rotational axis of a rotating DC motor or rotating stepping motor, wherein rotation of the ball screw is converted to direct linear motion by a displacement member may also be employed.

Although the present invention has been described above with detailed explanation given to a preferred embodiment, the invention is by no means strictly limited to the described embodiment, the type of coating liquid used is likewise not limited, and further, numerous variations which do not depart from the essential scope of the present invention may be readily envisioned by persons skilled in the art.

What is claimed is:

1. A suck back valve comprising:

a valve body having a first port and a second port formed therein, and a fluid passage intercommunicating said first port and said second port;

a diaphragm displacebly disposed in a chamber defined in said valve body, wherein said diaphragm comprises a first membrane, and a second membrane stacked on said first membrane and having a plurality of holes therein; and an actuator for displacing said diaphragm;

wherein a fluid which flows through said fluid passage is sucked by displacement of said diaphragm under activation of said actuator, and wherein said first membrane is sucked in a same direction as a direction of displacement of said diaphragm by a negative pressure introduced into said chamber through a passage disposed in said valve body by activation of a negative pressure generating source, together with being sucked into contact with said second membrane through said holes defined in said second membrane.

2. The suck back valve according to claim 1, wherein said diaphragm further comprises a cylindrical member surrounding an outer surface of a thick-walled portion of said diaphragm, with a screw element having a conical part inserted in a interior space of said cylindrical member, said conical part being inserted into a cross-sectionally v-shaped recess formed in said thick-walled portion, wherein said thick-walled portion of the diaphragm is supported on an end of said cylindrical member by expansion of said thick-walled portion in a radial outward direction.

3. The suck back valve according to claim 2, further comprising a flange formed with a curved surface, such that when said diaphragm is displaced toward said fluid passage together with said cylindrical member, said second membrane abuts said curved surface and is supported thereby along said curved surface.

4. The suck back valve according to claim 1, wherein said actuator comprises a linear voice coil type displacement device, said linear voice coil type displacement device having a stem displaced by activation of said linear voice coil type displacement device, wherein said diaphragm is displaced integrally with said stem.

5. The suck back valve according to claim 1, further comprising an ON/OFF valve disposed in said valve body for establishing and cutting-off communication between said first port and said second port.

6. The suck back valve according to claim 5, said ON/OFF valve further comprising:

an ON/OFF valve diaphragm for establishing and cutting-off communication between said first port and said second port; and an ON/OFF valve actuator for displacing said ON/OFF valve diaphragm;

wherein a negative pressure is introduced into a chamber in which said ON/OFF valve diaphragm is disposed through a passage disposed in said valve body, under activation of a negative pressure generating source, and said ON/OFF valve diaphragm is sucked in a same direction as the displacement direction by action of said negative pressure.

7. The suck back valve according to claim 6, wherein said ON/OFF valve diaphragm comprises a first membrane and a second membrane stacked on one side of said first membrane, wherein said first membrane is sucked into contact with said second membrane through a hole defined in said second membrane by activation of said negative pressure generating source.

8. The suck back valve according to claim 6, further comprising a cylindrical member disposed on said ON/OFF valve diaphragm surrounding an outer surface of a thick-walled portion of said ON/OFF valve diaphragm, a screw member having a conical part inserted in an interior space of said cylindrical member, said conical part being inserted into a cross-sectionally v-shaped recess formed in said thick-walled portion, wherein said thick-walled portion of said ON/OFF valve diaphragm is supported in an end of said cylindrical member by expansion of said thick-walled portion in a radial outward direction.

9. The suck back valve according to claim 6, wherein said ON/OFF valve actuator comprises a linear voice coil type displacement device, said linear voice coil type displacement device having a stem displaced by activation of said linear voice coil type displacement device, wherein said ON/OFF valve diaphragm is displaced integrally with said stem.

* * * * *